(12) United States Patent
Bhide et al.

(10) Patent No.: US 12,153,660 B2
(45) Date of Patent: Nov. 26, 2024

(54) VIRTUAL KEYBOARD CAPTCHA

(71) Applicant: International Business Machines Corporation, Armonk, NY (US)

(72) Inventors: Manish Anand Bhide, Hyderabad (IN); Madan K Chukka, Hyderabad (IN); Sai Prasanth Vuppala, Visakhapatnam (IN); Phani Kumar V. U. Ayyagari, Hyderabad (IN); PurnaChandra Rao Jasti, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 17/376,071

(22) Filed: Jul. 14, 2021

(65) Prior Publication Data
US 2023/0018027 A1 Jan. 19, 2023

(51) Int. Cl.
*H04L 9/40* (2022.01)
*G06F 3/04886* (2022.01)
*G06F 9/54* (2006.01)
*G06F 21/36* (2013.01)

(52) U.S. Cl.
CPC .......... *G06F 21/36* (2013.01); *G06F 3/04886* (2013.01); *G06F 9/541* (2013.01); *H04L 63/045* (2013.01); *H04L 63/102* (2013.01); *G06F 2221/2103* (2013.01); *G06F 2221/2133* (2013.01)

(58) Field of Classification Search
CPC ...... G06F 21/36; G06F 3/04886; G06F 9/541; G06F 2221/2103; G06F 2221/2133; G06F 21/31; H04L 63/045; H04L 63/102; H04L 63/083; H04L 63/0442
See application file for complete search history.

(56) References Cited

U.S. PATENT DOCUMENTS 9,699,176 B2 * 7/2017 Brown .................. G06F 21/316
9,935,939 B1 * 4/2018 Wendling .............. H04L 63/083
(Continued)

OTHER PUBLICATIONS

Disclosed Anonymously, et al., "A Method and System for Providing Smarter Completely Automated Public Turing test to tell Computers and Humans Apart (CAPTCHA) Analysis for Enabling Access to Websites", An IP.com Prior Art Database Technical Disclosure, PCOM000242167D, Jun. 22, 2015, 4 pgs., <https://priorart.ip.com/IPCOM/000242167>.
(Continued)

*Primary Examiner* — Michael Simitoski
*Assistant Examiner* — Hany S. Gadalla
(74) *Attorney, Agent, or Firm* — Edward J. Wixted, III

(57) ABSTRACT

In an approach, a processor receives a request to access an electronic resource from a device. A processor causes the device to generate a Completely Automated Public Turing test (CAPTCHA), where the CAPTCHA comprises: a virtual keyboard; an ordered string of characters required to be input; and presentation of a highlighted key of the virtual keyboard on the device, wherein (i) the highlighted key is a first key visually distinct from other keys of the virtual keyboard and (ii) the first key corresponds to a character of the ordered string of characters. A processor receives a result of the CAPTCHA from the device. A processor performs an action based on the result.

15 Claims, 4 Drawing Sheets

(56) References Cited

U.S. PATENT DOCUMENTS

| | | | |
|---|---|---|---|
| 2012/0166335 A1* | 6/2012 | Bakshi | G06Q 20/4012 |
| | | | 705/44 |
| 2015/0084871 A1* | 3/2015 | Yarvis | G06F 3/04886 |
| | | | 345/172 |
| 2015/0242087 A1* | 8/2015 | Elangovan | G06F 9/451 |
| | | | 715/773 |
| 2016/0055329 A1* | 2/2016 | Akula | G06F 3/04883 |
| | | | 726/7 |
| 2016/0070902 A1* | 3/2016 | Malone | G06F 21/316 |
| | | | 726/3 |
| 2017/0052702 A1* | 2/2017 | Norris, III | G06F 40/274 |
| 2017/0262623 A1* | 9/2017 | Plenderleith | G06F 21/36 |
| 2018/0197157 A1* | 7/2018 | Magee | G07D 11/00 |
| 2018/0253176 A1* | 9/2018 | Hajimusa | G06F 21/31 |
| 2018/0253230 A1 | 9/2018 | Puppin | |
| 2018/0314816 A1* | 11/2018 | Turgeman | G06F 21/40 |
| 2018/0341402 A1* | 11/2018 | Kim | H04L 9/3236 |
| 2019/0057206 A1* | 2/2019 | Deng | G06F 3/04886 |
| 2020/0065467 A1* | 2/2020 | Komnata | G06F 21/36 |
| 2021/0326432 A1* | 10/2021 | Kaidi | H04L 9/3226 |

OTHER PUBLICATIONS

Ma, et al., "Method and System for Providing a Custom Keyboard for Solving CAPTCHA on a mobile device", An IP.com Prior Art Database Technical Disclosure, IPCOM000237372D, Jun. 16, 2014, 5 pgs., <https://priorart.ip.com/IPCOM/000237372>.

Patel, et al., "A Simple and Efficient Text-Based CAPTCHA Verification Scheme Using Virtual Keyboard", Information and Communication Technology for Intelligent Systems (ICTIS 2017)—vol. 2. ICTIS 2017, pp. 121-126, Smart Innovation, Systems and Technologies, vol. 84., © Springer International Publishing AG 2018, Aug. 17, 2017, 6 pgs., <https://doi.org/10.1007/978-3-319-63645-0_13>.

Roshanbin, et al., "A Survey and Analysis of Current CAPTCHA Approaches", Journal of Web Engineering, vol. 12, No. 1&2 (2013) 001-040, © Rinton Press, 40 pgs.

Thangavelu, et al., "Invisible Captcha Using Encrypted Virtual Keyboard", Middle-East Journal of Scientific Research 24 (10), 2016, 6 pgs., © IDOSI Publications, India.

\* cited by examiner

VIRTUAL KEYBOARD CAPTCHA

BACKGROUND

The present invention relates generally to the field of Completely Automated Public Turing tests (CAPTCHAs), and more particularly to a CAPTCHA operating within an operating system (OS) virtual keyboard wherein the virtual keyboard highlights characters to be entered by the user.

CAPTCHA is a type of challenge-response test used in computing to determine whether a user is human. CAPTCHA is often used to prevent bots from logging into websites without user intervention by confirming that the login was performed by a human user as opposed to a bot or automated script.

A virtual keyboard is a software component that allows the input of characters without the need for physical keys. Typically, interaction with a virtual keyboard happens via a touchscreen interface. In a physical keyboard, the positions of keys are fixed. In a virtual keyboard, the position of keys and their values may be changed according to software requirements. Virtual keyboards are commonly used as an on-screen input method in devices with no physical keyboard where text is commonly inputted either by tapping the virtual keyboard or finger-tracing.

SUMMARY

According to one embodiment of the present invention, a computer-implemented method, computer program product, and computer system are provided. A processor receives a request to access an electronic resource from a device. A processor causes the device to generate a Completely Automated Public Turing test (CAPTCHA), where the CAPTCHA comprises: a virtual keyboard; an ordered string of characters required to be input; and presentation of a highlighted key of the virtual keyboard on the device, wherein (i) the highlighted key is a first key visually distinct from other keys of the virtual keyboard and (ii) the first key corresponds to a character of the ordered string of characters. A processor receives a result of the CAPTCHA from the device. A processor performs an action based on the result.

DETAILED DESCRIPTION

Embodiments of the present invention recognize that Completely Automated Public Turing test (CAPTCHA) approaches that utilize, for example, distorted letters or words can be challenging for users to decode, resulting in incorrectly entered characters and user frustration. Embodiments of the present invention describe a CAPTCHA approach that feeds CAPTCHA characters to an operating system (OS), for presentation on a virtual keyboard via highlighting of characters on the virtual keyboard. A user may then select the highlighted characters directly within the virtual keyboard to solve the CAPTCHA and obtain access to the requested resource.

The present invention will now be described in detail with reference to the Figures.

Figure 1:
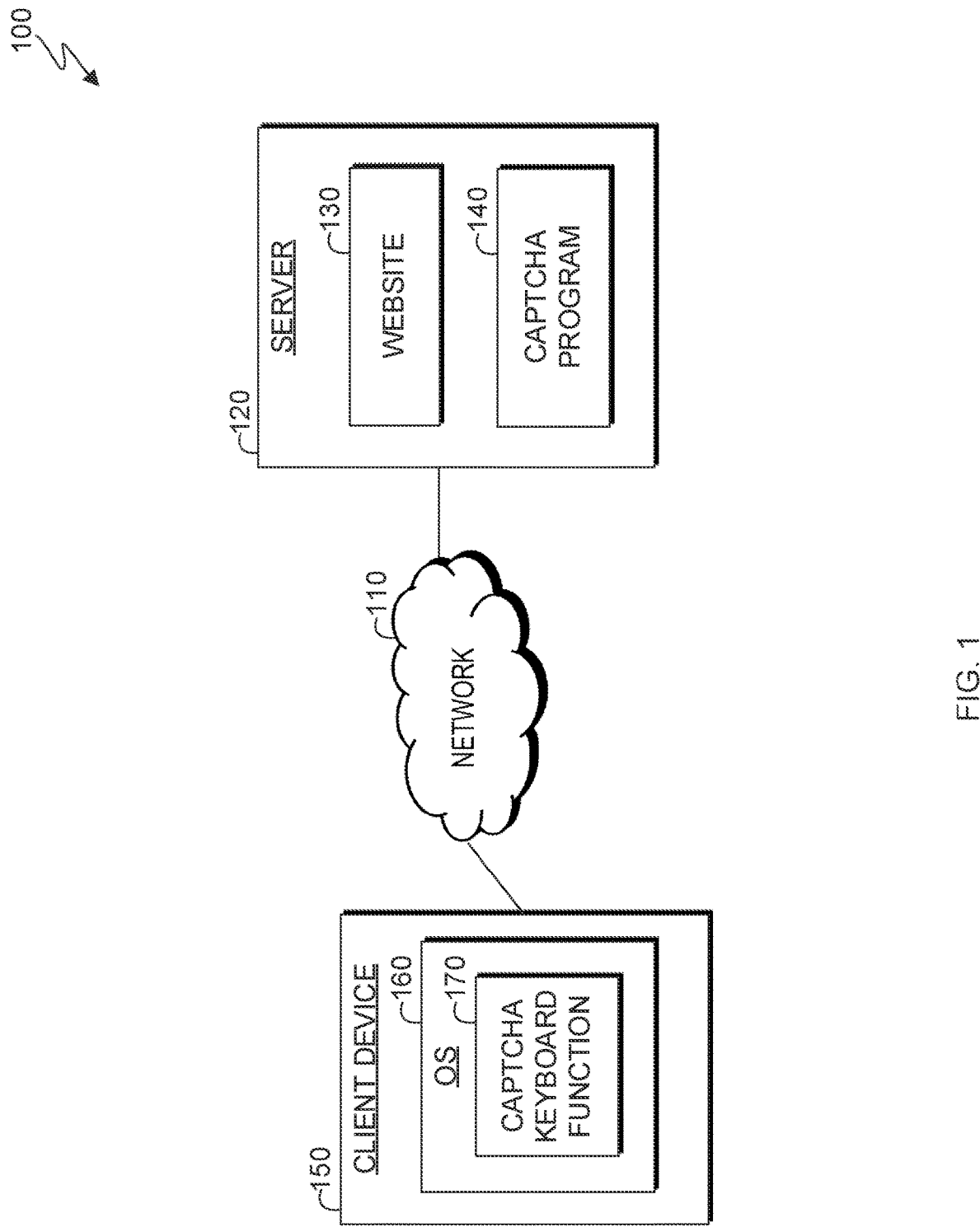
FIG. 1 is a functional block diagram illustrating a computer environment, in accordance with an embodiment of the present invention.

FIG. 1 is a functional block diagram illustrating a computing environment, generally designated 100, in accordance with one embodiment of the present invention. FIG. 1 provides only an illustration of one embodiment and does not imply any limitations with regards to the environments in which different embodiments may be implemented.

In the depicted embodiment, computing environment 100 includes server 120 and client device 150 interconnected over network 110. Network 110 may be a local area network (LAN), a wire area network (WAN), such as the Internet, the public switched telephone network (PSTN), any combination thereof, or any combination of connections and protocols that will support communications between server 120 and client device 150, in accordance with embodiments of the present invention. Network 110 may include wired, wireless, or fiber optic connections. Computing environment 100 may include additional servers, computing devices, or other devices not shown.

Server 120 may be a management server, a web server, or any other electronic device or computing system capable of sending and receiving data and communicating with client device 160 via, for example, network 110. In some embodiments, server 120 may represent a server computing system utilizing multiple computers as a server system, such as in a cloud computing environment. Server 120 may be an enterprise server capable of hosting or otherwise managing access to a website, such as website 130. Server 120 contains website 130 and CAPTCHA program 140. Server 120 may include components, as depicted and described in further detail with respect to FIG. 4.

Website 130 is a website that is accessible upon successful completion of a CAPTCHA challenge, such as the CAPTCHA challenge provided by CAPTCHA program 140 for a user at client device 150.

It should be noted that embodiments of the present invention contemplate embodiments where website 130 may be an application, repository, or other resource that a user is attempting to access. The term website 130 is used herein only for sake of simplicity in discussing embodiments of the present invention. In general, it is contemplated that website 130 is any electronic resource that requires the successful completion of a CAPTCHA in order to grant access.

CAPTCHA program 140 operates to call the virtual keyboard for client device 150 via, for example, an application programming interface (API) of the OS of client device 150. In some embodiments, the API called is CAPTCHA keyboard function 170. CAPTCHA program 140 utilizes CAPTCHA keyboard function 170 to send CAPTCHA data and cause client device 150 to display a virtual keyboard where keys that are to be entered by the user are highlighted on the virtual keyboard. Upon receiving inputs from the user, CAPTCHA program 140 grants/denies access to the resource, such as website 130, based on whether the CAPTCHA was successfully completed by the user. In one embodiment, CAPTCHA program 140 resides on a server containing website 130, such as server 120. In other embodiments, CAPTCHA program 140 may reside on another server, or another computing device, provided that CAPTCHA program 140 can communicate with website 130 and CAPTCHA keyboard function 170. In some embodiments, CAPTCHA program 140 is integrated with a particular website, such as website 130. In other embodiments, CAPTCHA program 140 may be an external application implemented as a microservice or module that operates to provide CAPTCHA services for website 130.

Client device 150 may be a desktop computer, laptop computer, netbook computer, tablet computer, personal digital assistant (PDA), or smartphone. In general, client device 150 may be any electronic device or computing system capable of displaying a virtual keyboard, sending and receiving data, and communicating with server 120, website 130, and/or CAPTCHA program 140 via, for example, network 110. In some embodiments, client device 150 may include a touchscreen capable of accepting input for the virtual keyboard. In other embodiments, data is entered into the virtual keyboard via, for example, mouse and/or physical keyboard input methods. Client device 150 contains OS 160 and CAPTCHA keyboard function 170. Client device 150 may include components, as depicted and described in further detail with respect to FIG. 4.

OS 160 is an operating system of client device 150. OS 160 manages computer hardware, software resources, and provides common services for computer programs operating on client device 150. OS 160 may be any operating system that, in general, is capable of generating a virtual keyboard. In some embodiments, the virtual keyboard is a virtual keyboard defined by OS 160. In other embodiments, OS 160 may certify third party virtual keyboards in order to enable such third party virtual keyboard to be utilized with CAPTCHA keyboard function 170. OS 160 includes CAPTCHA keyboard function 170. OS 160 may be stored to memory and/or persistent storage of client device 150, as depicted and described in further detail with respect to FIG. 4.

CAPTCHA keyboard function 170 operates to request CAPTCHA character data, send private keys for encryption of CAPTCHA data, decrypt received CAPTCHA data, and utilize the received CAPTCHA data to generate and display a virtual keyboard that includes highlighted characters for user entry that are to be selected by a user in order to succeed in completing the CAPTCHA. In general, CAPTCHA keyboard function 170 highlights a single character at a time on the virtual keyboard until all characters required for completion of the CAPTCHA have been entered by the user. CAPTCHA keyboard function 170 returns results of the CAPTCHA to CAPTCHA program 140 such that CAPTCHA program 140 can determine whether to grant or deny the user access to the resource (e.g., website 130). In general CAPTCHA keyboard function 170 is a function of OS 160. In some embodiments, CAPTCHA keyboard function 170 is an API of OS 160 that is called by CAPTCHA program 140 to coordinate CAPTCHA data exchange and presentation to the user at client device 150.

Figure 2:
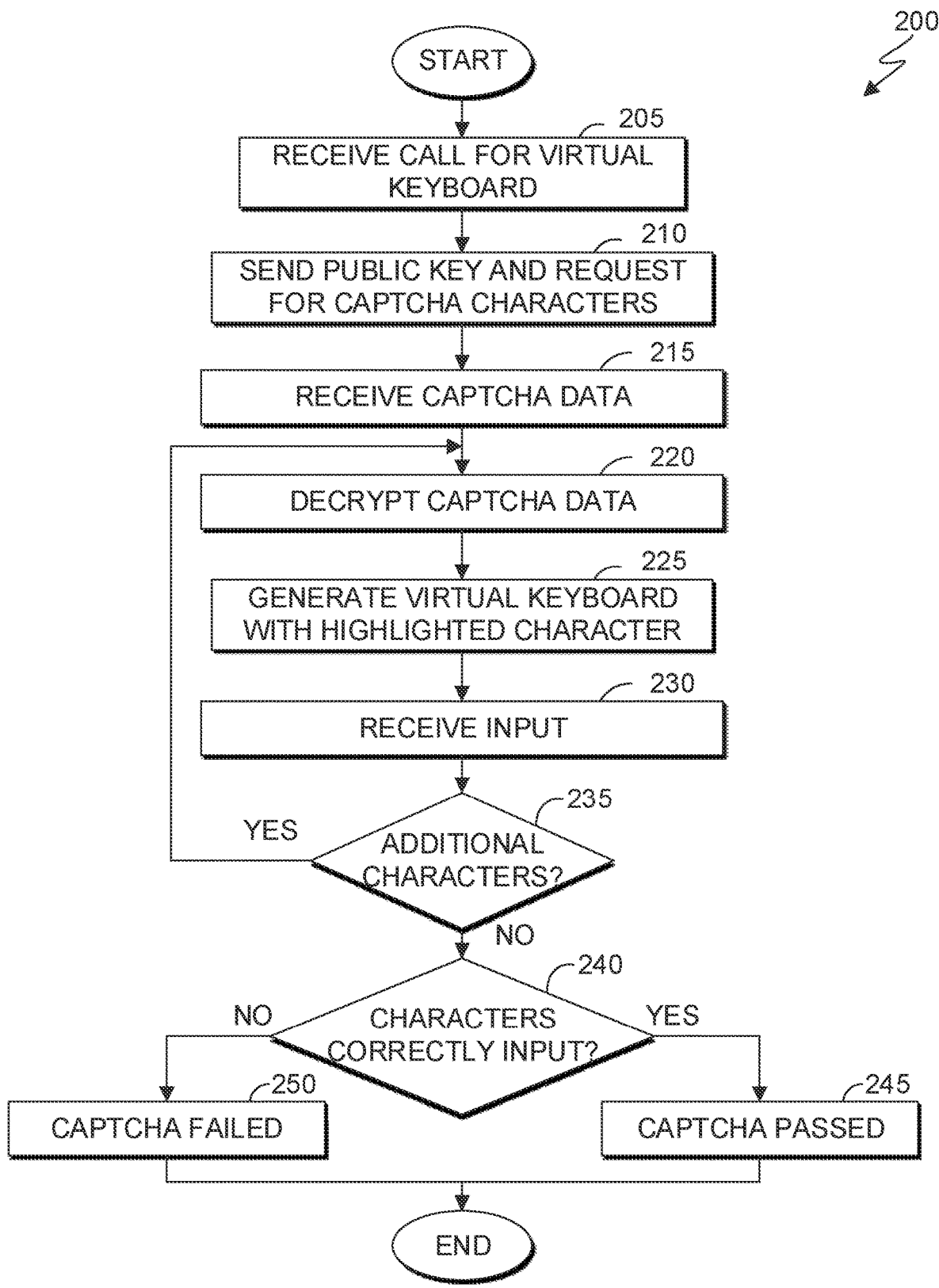
FIG. 2 is a flowchart depicting operational steps of a Completely Automated Public Turing test (CAPTCHA) keyboard function for coordinating and presenting a CAPTCHA on a client device attempting to access an electronic resource, in accordance with an embodiment of the present invention.

FIG. 2 depicts a flowchart 200 for the steps of CAPTCHA keyboard function 170, a function of OS 160 (e.g., API), executing within computing environment 100 of FIG. 1, for coordinating CAPTCHA data exchange with CAPTCHA program 140 and presenting the CAPTCHA to a user at client device 150 via a virtual keyboard of client device 150. In embodiments where CAPTCHA keyboard function 170 is an API, CAPTCHA keyboard function 170 may be exposed by OS 160 such that a variety of applications may use CAPTCHA keyboard function 170 to use and send CAPTCHAs.

In one embodiment, initially, a user at client device 150 attempts to access a resource, such as website 130. Upon accessing a uniform resource locator (URL) of website 130, the user may, in some embodiments, automatically encounter a CAPTCHA generated by CAPTCHA keyboard function 170 in coordination with CAPTCHA program 140. In other embodiments, the user may have to perform an action which initiates the CAPTCHA generation process. For example, a user may encounter a login screen and the CAPTCHA generation process occurs after receiving the user's login credentials. In some embodiments, the action may include a user selection to initiate the generation of the CAPTCHA.

In step 205, CAPTCHA keyboard function 170 receives a call for the virtual keyboard along with a flag indicating that the call is for CAPTCHA. A flag is a value that acts as a signal for a function or process. In general, such a call may be generated by CAPTCHA program 140 in response to a user accessing website 130.

In step 210, CAPTCHA keyboard function 170 sends a request for CAPTCHA characters to CAPTCHA program 140. CAPTCHA keyboard function 170 also includes a public key with the request, the public key being of an asymmetric cryptography key pair. The public key allows CAPTCHA program 140 to encrypt the CAPTCHA characters.

In step 215, CAPTCHA keyboard function 170 receives the encrypted CAPTCHA data, which includes encrypted versions of the characters required to successfully complete the CAPTCHA, along with an order in which the characters need to be entered to complete the CAPTCHA. Typically, the characters required to successfully complete the CAPTCHA will comprise a ordered string of text that may consist of words, numbers, or symbols accessible via a virtual keyboard. In some embodiments, the received encrypted CAPTCHA data may also include additional information associated with the CAPTCHA, such as number/amount of errors allowed, time period requirements for completion of the CAPTCHA, or other information delineating requirements of the CAPTCHA.

In step 220, CAPTCHA keyboard function 170 decrypts the CAPTCHA data using the private key of the asymmetric cryptography key pair. The private key is used to decrypt information encrypted using the public key that was previous sent to CAPTCHA program 140 and used by CAPTCHA program 140 to encrypt the CAPTCHA data (see step 210).

In step 225, CAPTCHA keyboard function 170 generates the virtual keyboard with the necessary highlighted character and presents the virtual keyboard and highlighted character on a display device of client device 150. The necessary highlighted character is the character that the CAPTCHA is currently requiring to be input by the user. For example, if the decrypted CAPTCHA data (see step 220) includes an ordered string of characters "@F44vcs", then CAPTCHA keyboard function 170 initially highlights the "@" key on the virtual keyboard. In subsequent loops (see decision 235, yes branch), CAPTCHA keyboard function 170 removes the highlighting of the already input characters and instead highlights the next character that is required to be entered to successfully complete the CAPTCHA. For example, after a user selects the "@" key, CAPTCHA keyboard function 170 removes the highlighting of the "@" key and, instead, highlights the "F" key. In some embodiments, such as when a capital "F" is required, CAPTCHA keyboard function 170 highlights the shift key in addition to the "F" key, otherwise provides an instruction that a capital letter is required, or, in some embodiments, CAPTCHA keyboard function 170 may automatically select the shift key such that a capital letter is input without the user selecting a shift key. For example, some virtual keyboards include a predictive text suggestion area above the virtual keyboard. In some embodiments, the predictive text suggestion area may include instructions such as a requirement that the entered letter be capitalized. Similarly, if the virtual keyboard is broken up into multiple sections (e.g., a letters view and a numbers/symbols view) and the required input character is on another section (i.e., other than the default section), CAPTCHA keyboard function 170 may highlight the item that cycles through the different keyboard views, automatically change the keyboard to the view that includes the required input character, or provide instructions to cycle to another section of the keyboard to find the required input character.

In some embodiments, CAPTCHA keyboard function 170 uses the default keyboard that is integrated within OS 160 or otherwise the default selection of OS 160 and client device 150. As the OS default keyboard is used, third party or malware actors cannot generate keyboards and act as bots to intrude on and attempt to complete the CAPTCHA. However, some embodiments of the present invention may provide an option to certify keyboards for use with CAPTCHA keyboard function 170 in generating a virtual keyboard and highlighting characters for the CAPTCHA.

CAPTCHA keyboard function 170 may highlight the required input character on the virtual keyboard in a variety of ways. In some embodiments, CAPTCHA keyboard function 170 may change the color of the character or key itself. In other embodiments, CAPTCHA keyboard function 170 may bold, highlight, italicize, or otherwise change the appearance of the required input character on the virtual keyboard. In some embodiments, CAPTCHA keyboard function 170 may cause the required input character to become larger than other keys on the virtual keyboard. In general, CAPTCHA keyboard function 170 may modify the appearance of the character depiction on the key of the virtual keyboard, the size of such a key, or the appears of a background of such a key. CAPTCHA keyboard function 170 may modify the key corresponding to the required input character in any way to distinguish the key from other keys of the virtual keyboard and highlight the key associated with the required input to the user.

While embodiments described herein specifically discuss a virtual keyboard, embodiments of the present invention recognize that physical keyboards may be utilized. For example, a physical keyboard connected to client device 150 may include light-emitting diode (LED), or otherwise lit up keys and CAPTCHA keyboard function 170 may selectively light up individual keys or change the color of individual keys. In other embodiments, the keys of the physical keyboard may be individual buttons that each include electronic ink displays depicting the characters. In such embodiments, CAPTCHA keyboard function 170 may selectively change the electronic ink displays on the individual keys and cause the required input character key to appear differently than the other keys of the physical keyboard.

In step 230, CAPTCHA keyboard function 170 receives input of a selected character. In general, CAPTCHA keyboard function 170 receives input provided by a user via the virtual keyboard and user interface of client device 150. As described above, the input may be via touch screen or mouse/keyboard. In some embodiments, a user may use a physical keyboard to input characters on a virtual keyboard that is present on a display device of client device 150. In some embodiments, such as in an augmented reality environment, the input may be performed by monitoring the gaze of a user within a heads-up display utilizing, for example, smart glasses or a virtual reality headset and one or more sensors.

In decision 235, CAPTCHA keyboard function 170 determines whether there are additional characters to be input in order to successfully complete the CAPTCHA. CAPTCHA keyboard function 170 may identify already input characters and keep track of characters that have already been presented and highlighted within the virtual keyboard. As described above, the CAPTCHA is typically an ordered string of characters that may be, for example, words, phrases, sentences, randomized characters, or any other ordered string of letters, numbers, characters, or symbols that are accessible via a virtual keyboard.

If CAPTCHA keyboard function 170 determines that there are additional characters in the decrypted CAPTCHA data (decision 235, yes branch), CAPTCHA keyboard function 170 loops back to step 225, removes the highlight of the previously input character and highlights the next character that is to be input by the user.

If CAPTCHA keyboard function 170 determines that there are no additional characters in the decrypted CAPTCHA data, (decision 235, no branch), CAPTCHA keyboard function 170 determines whether the characters were correctly input (decision 240). CAPTCHA keyboard function 170 determines whether the characters were correctly input by comparing the input ordered string of characters to the ordered string of characters supplied by the decrypted CAPTCHA data. It should be noted that, in other embodiments, CAPTCHA keyboard function 170 may determine whether a character is correctly input at a more granular level. For example, CAPTCHA keyboard function 170 may determine whether each character entered is the correct character at time of entry and may, for example, notify the user of correct/incorrect entry upon the user's entry of each character. In other embodiments, as initially described, CAPTCHA keyboard function 170 may wait until the entire character string has been entered before comparing the entered character string to the character string obtained from the decrypted CAPTCHA data. In some embodiments, the decrypted CAPTCHA data also specifies which approach to take.

If CAPTCHA keyboard function 170 determines that the characters were correctly input by the user (decision 240, yes branch), CAPTCHA keyboard function 170 determines that the CAPTCHA has been passed by the user (step 245) and sends a notification that the CAPTCHA has been passed to CAPTCHA program 140.

If CAPTCHA keyboard function 170 determines that the characters were incorrectly input by the user (decision 240, yes branch), CAPTCHA keyboard function 170 determines that the CAPTCHA was failed by the user (step 250) and sends a notification that the CAPTCHA has been failed to CAPTCHA program 140.

Embodiments of the present invention recognize that, in addition to merely confirming that the characters were correctly input by the user, CAPTCHA keyboard function 170 may utilize other factors to determine whether the CAPTCHA was passed or failed based information in the CAPTCHA data or other previously defined requirements for passing the CAPTCHA. For example, the CAPTCHA may require that the characters be input within a specific time period (e.g., within two minutes of starting the CAPT- CHA), an amount of errors that may be permitted (e.g., a number of incorrect characters in the required character string, a number of incorrect keystrokes permitted). For example, if an embodiment allows four incorrect keystrokes, a user may incorrectly select up to four keys before failing the CAPTCHA. In such an embodiment, the user may be notified of the incorrect input and instructed to try again and input the correct character. In general, different implementations of CAPTCHA may include different requirements and CAPTCHA keyboard function 170 may operably determine whether such requirements have been met in determining whether the CAPTCHA failed or passed.

Figure 3:
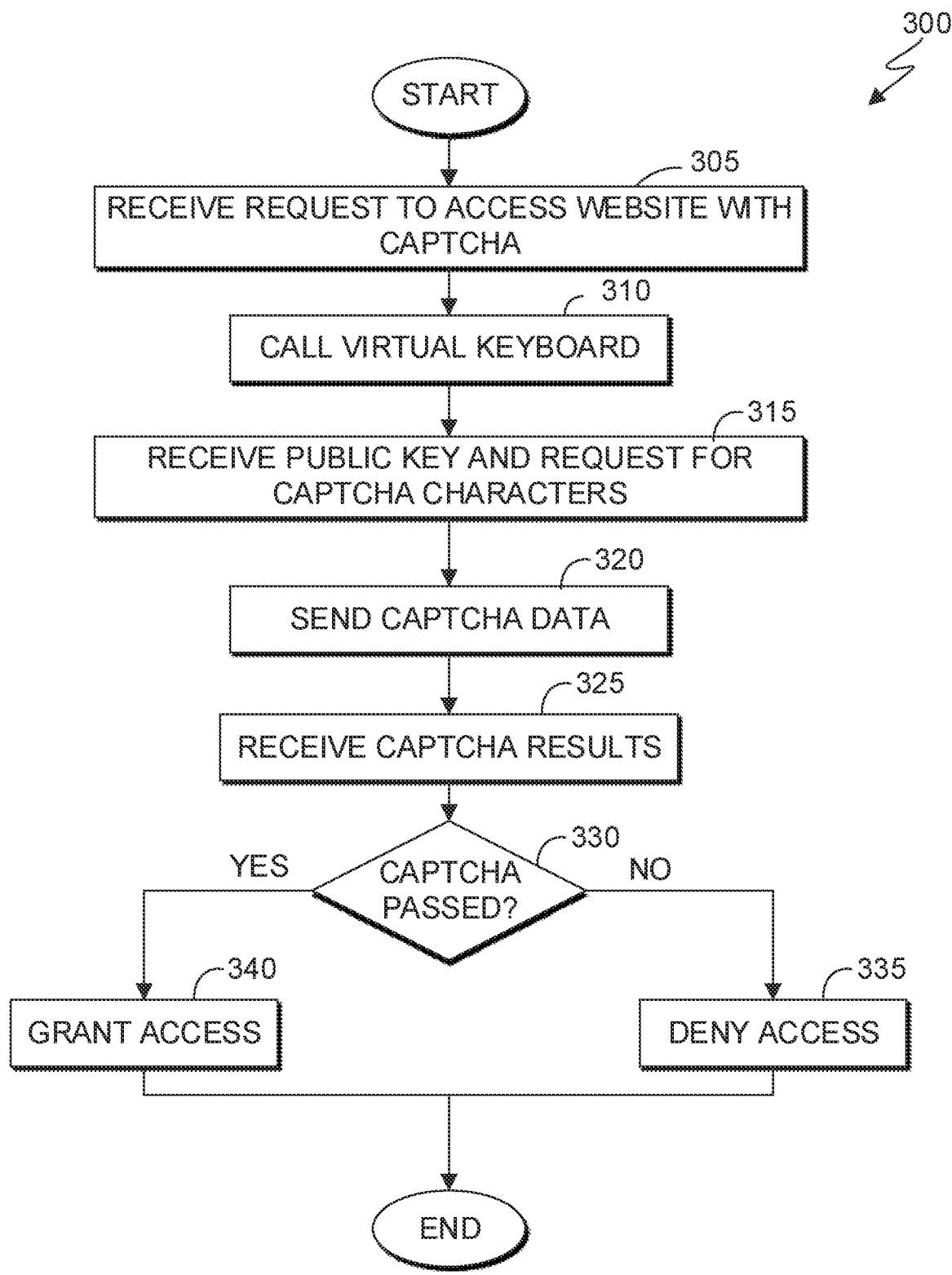
FIG. 3 is a flowchart depicting operation steps of a CAPTCHA program for coordinating a CAPTCHA and determining whether to grant access to an electronic resource, based on results of the CAPTCHA, in accordance with an embodiment of the present invention.

FIG. 3 depicts a flowchart 300 for the steps of CAPTCHA program 140, executing within computing environment 100 of FIG. 1, for responding to requests to access a resource, such as website 130, by sending CAPTCHA data to CAPTCHA keyboard function 170 and causing a CAPTCHA to be displayed on a virtual keyboard of client device 150.

In step 305, CAPTCHA program 140 receives a request to access a resource, such as website 130, that is protected by CAPTCHA. In general, CAPTCHA is utilized to identify whether an entity attempting to access a resource is a human or, for example, a bot. In some instances, an owner of a resource, such as website 130, may not want bots accessing the resource and utilizes CAPTCHA to help determine that the accessing entity is a human, before granting access. In some embodiments, the attempt to access website 130 may be subsequent to a login attempt by a user (e.g., username/password login), in other embodiments the attempt to access website 130 may occur merely by visiting a particular URL, selecting an "enter site" type icon, or another action by the user.

In step 310, CAPTCHA program 140 calls for a virtual keyboard on client device 150 via CAPTCHA keyboard function 170 of OS 160. In some embodiments, CAPTCHA keyboard function 170 is an API of OS 160 and the call is an API call. The call also includes a flag that is set to indicate that the call is for the generation of a CAPTCHA.

In step 315, CAPTCHA program 140 receives a public key and a request for CAPTCHA characters from CAPTCHA keyboard function 170. CAPTCHA program 140 generates or otherwise selects characters for the CAPTCHA, typically in the format of an ordered string of characters. As described above, the ordered string of characters may include words, phrases, sentences, or randomized type ordered character strings. CAPTCHA program 140 uses the public key to encrypt the CAPTCHA characters. In some embodiments, CAPTCHA program also generates or otherwise selects rules or requirements of the CAPTCHA and includes such information in the CAPTCHA data, either encrypted with the public key or unencrypted, depending on the particular implemented of such an embodiment of the present invention. As described above, such CAPTCHA requirements may include time periods within with the CAPTCHA must be completed (e.g., one minute), error threshold limits, number of retries permitted, or any other type of requirement for the CAPTCHA. As described above, such requirements may be used by CAPTCHA keyboard function 170 to determine whether the user successfully completes the CAPTCHA.

In step 320, CAPTCHA program 140 sends the CAPTCHA data to CAPTCHA keyboard function 170. CAPTCHA program 140 sends the data, encrypted using the public key received from CAPTCHA keyboard function 170. By encrypting the CAPTCHA data, the data is secure and, as the private key is only accessible by CAPTCHA keyboard function 170, a function of OS 160, or OS 160 itself, a secure channel for delivering the CAPTCHA is created and it is difficult for bots or third party applications to intercept or otherwise intrude on and successfully complete the CAPTCHA.

In step 325, CAPTCHA program 140 receives the CAPTCHA results. As described above, CAPTCHA keyboard function 170 determines whether the CAPTCHA was successfully completed (see steps 240-250) and sends notifications of the CAPTCHA results to CAPTCHA program 140.

In decision 330, CAPTCHA program 140 determines whether the CAPTCHA has been successfully passed by the user of client device 150. CAPTCHA program 140 determines whether the CAPTCHA has been successfully passed based on the results obtained from CAPTCHA keyboard function 170 (see step 325).

If CAPTCHA program 140 determines that the CAPTCHA was not passed, or failed (e.g., due to incorrectly input characters, a timeout, or other factors, as per requirements of the CAPTCHA), CAPTCHA program 140 denies access to the resource (e.g., website 130) (step 335). In some embodiments, users may immediately retry a new instances of the CAPTCHA and the process described herein may be repeated. In other embodiments, a preselected time period must elapse before the user can make another attempt, multi-factor authentication may be required, or a user may be locked out (permanently or temporarily) from accessing the resource (e.g., website 130).

If CAPTCHA program 140 determines that the CAPTCHA was successfully passed, CAPTCHA program 140 grants access to the resource (step 340) by, for example, allowing the user to access website 130.

Figure 4:
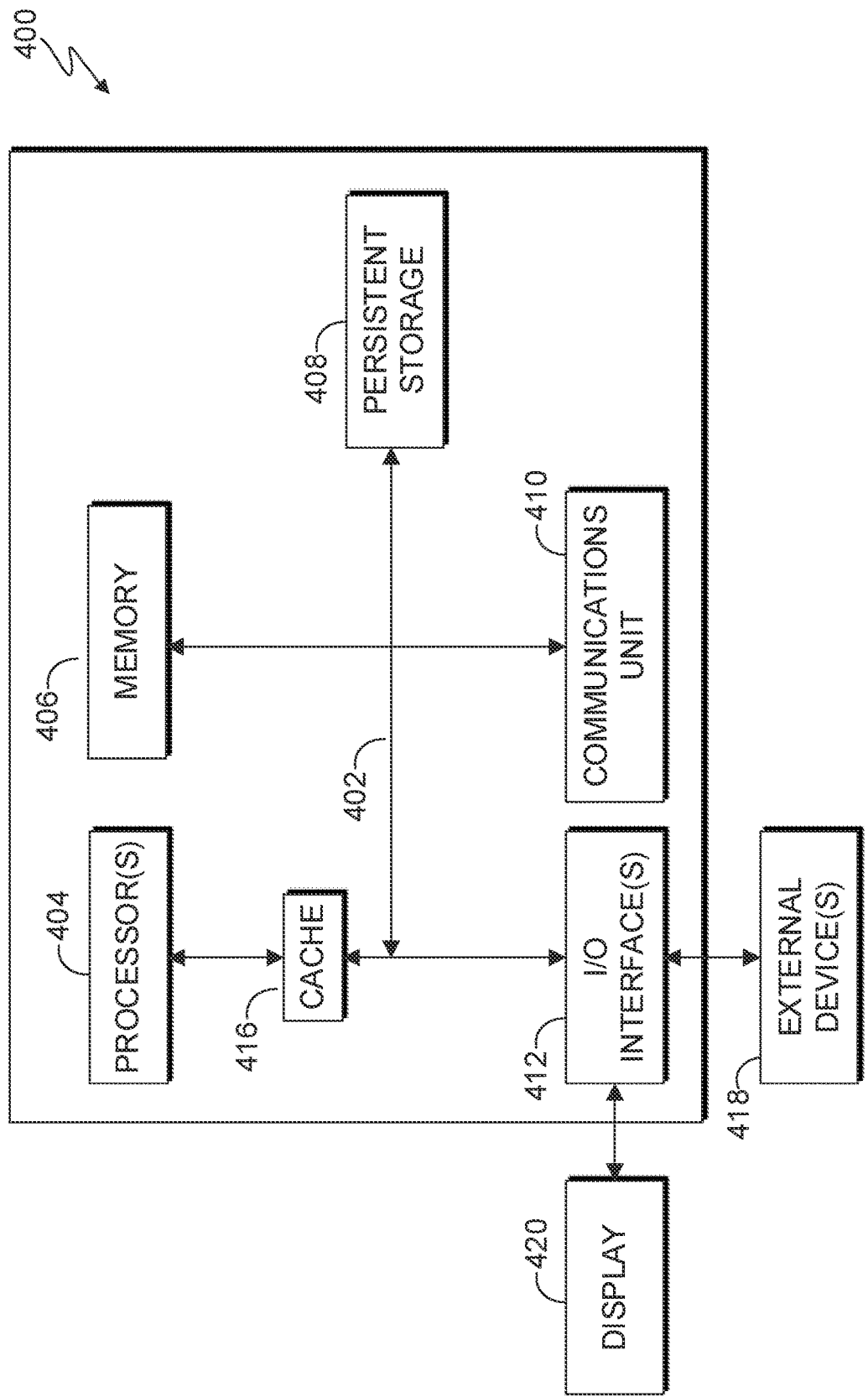
FIG. 4 is a block diagram of components of the client device and server of FIG. 1, in accordance with an embodiment of the present invention.

FIG. 4 depicts a block diagram of components of server 120 and client device 150 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 120 and client device 150 each include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

OS 160 and CAPTCHA keyboard function 170 may be stored in persistent storage 408 of client device 150 and in memory 406 of client device 150 for execution by one or more of the respective computer processors 404 of client device 150 via cache 416 of client device 150. Website 130 and CAPTCHA program 140 may be stored in persistent storage 408 of server 120 and in memory 406 of server 120 for execution and/or access by one or more of the respective computer processors 404 of server 120 via cache 416 of server 120. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. OS 160 and CAPTCHA keyboard function 170 may be downloaded to persistent storage 408 of client device 150 through communications unit 410 of client device 150. Website 130 and CAPTCHA program 140 may be downloaded to persistent storage 408 of server 120 through communications unit 410 of server 120.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., OS 160 and CAPTCHA keyboard function 170, can be stored on such portable computer readable storage media and can be loaded onto persistent storage 408 of client device 150 via I/O interface(s) 412 of client device 150. Software and data used to practice embodiments of the present invention, e.g., website 130 and CAPTCHA program 140, can be stored on such portable computer readable storage media and can be loaded onto persistent storage 408 of server 120 via I/O interface(s) 412 of server 120. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, a request to access an electronic resource from a device;
   responsive to receiving the request to access the electronic resource from the device, calling, by one or more processors, an application programming interface (API) of an operating system (OS) of the device for: (i) calling a default virtual keyboard integrated within the OS of the device and (ii) coordinating delivery and presentation of a Completely Automated Public Turing test (CAPTCHA) by the device;
   causing, by one or more processors, the OS of the device to locally generate: (i) the default virtual keyboard integrated within the OS of the device and (ii) the CAPTCHA on the device, wherein;
      causing the OS of the device to locally generate: (i) the default virtual keyboard integrated within the OS of the device and (ii) the CAPTCHA comprises:
         receiving, by one or more processors, from the device, a public key of a key pair and a request for the ordered string of characters, wherein a private key of the key pair is possessed by the device;
         encrypting, by one or more processors, using the public key, the ordered string of characters; and
         sending, by one or more processors, the ordered string of characters to the device; and
      the CAPTCHA comprises:
         the default virtual keyboard integrated within the OS of the device; and
         a dynamic presentation of a series of highlighted keys of the default virtual keyboard integrated within the OS of the device, wherein:
            each highlighted key is a particular key that is visually distinct from other keys of the default virtual keyboard integrated within the OS of the device;
            each highlighted key corresponds to a character of an ordered string of characters required to be input; and
            responsive to user selection of a first key that is highlighted, highlighting of the first key is removed and a second key is highlighted;
   receiving, by one or more processors, a result of the CAPTCHA from the device; and
   performing, by one or more processors, an action based on the result.

2. The computer-implemented method of claim 1, wherein the first key is highlighted via modifying a size of the first key to be larger than all other keys on the virtual keyboard.

3. The computer-implemented method of claim 1, wherein:
   the result is that the CAPTCHA was completed successfully; and
   the action comprises granting access to the electronic resource.

4. The computer-implemented method of claim 1, wherein:
   the result is that the CAPTCHA was not completed successfully; and
   the action comprises denying access to the electronic resource.

5. The computer-implemented method of claim 1, wherein:
   the CAPTCHA further comprises a requirement associated with the input; and
   the requirement associated with the input is a number of incorrect character inputs in the ordered string that is permitted.

6. The computer-implemented method of claim 1, wherein the character of the ordered string of characters is a first letter, the CAPTCHA further comprising presentation of a highlighted shift key of the default virtual keyboard integrated within the OS of the device, wherein the highlighted shift key is highlighted to be: (i) visually similar to the first key that is highlighted and (ii) visually distinct from other keys of the default virtual keyboard integrated within the OS of the device.

7. The computer-implemented method of claim 1, wherein a predictive text suggestion area located above the default virtual keyboard integrated within the OS of the device includes an instruction for the CAPTCHA.

8. A computer program product comprising:
one or more computer readable storage media, and program instructions collectively stored on the one or more computer readable storage media, the program instructions comprising:
program instructions to receive a request to access an electronic resource from a device;
program instructions to, responsive to receiving the request to access the electronic resource from the device, call an application programming interface (API) of an operating system (OS) of the device for: (i) calling a default virtual keyboard integrated within the OS of the device and (ii) coordinating delivery and presentation of a Completely Automated Public Turing test (CAPTCHA) by the device;
program instructions to cause the OS of the device to locally generate: (i) the default virtual keyboard integrated within the OS of the device and (ii) the CAPTCHA on the device, wherein:
program instructions to cause the OS of the device to locally generate: (i) the default virtual keyboard integrated within the OS of the device and (ii) the CAPTCHA comprise:
program instructions to receive, from the device, a public key of a key pair and request for the ordered string of characters, wherein a private key of the key pair is possessed by the device;
program instructions to encrypt, using the public key, the ordered string of characters; and
program instructions to send the ordered string of characters to the device; and
the CAPTCHA comprises:
the default virtual keyboard integrated within the OS of the device; and
a dynamic presentation of a series of highlighted keys of the default virtual keyboard integrated within the OS of the device, wherein:
each highlighted key is a particular key that is visually distinct from other keys of the default virtual keyboard integrated within the OS of the device;
each highlighted key corresponds to a character of an ordered string of characters required to be input; and
responsive to user selection of a first key that is highlighted, highlighting of the first key is removed and a second key is highlighted;
program instructions to receive a result of the CAPTCHA from the device; and
program instructions to perform an action based on the result.

9. The computer program product of claim 8, wherein the first key is highlighted via modifying a size of the first key to be larger than all other keys on the virtual keyboard.

10. The computer program product of claim 8, wherein:
the result is that the CAPTCHA was completed successfully; and
the action comprises granting access to the electronic resource.

11. The computer program product of claim 8, wherein:
the result is that the CAPTCHA was not completed successfully; and
the action comprises denying access to the electronic resource.

12. A computer system comprising:
one or more computer processors, one or more computer readable storage media, and program instructions collectively stored on the one or more computer readable storage media for execution by at least one of the one or more computer processors, the program instructions comprising:
program instructions to receive a request to access an electronic resource from a device;
program instructions to, responsive to receiving the request to access the electronic resource from the device, call an application programming interface (API) of an operating system (OS) of the device for: (i) calling a default virtual keyboard integrated within the OS of the device and (ii) coordinating delivery and presentation of a Completely Automated Public Turing test (CAPTCHA) by the device;
program instructions to cause the OS of the device to locally generate: (i) the default virtual keyboard integrated within the OS of the device and (ii) the CAPTCHA on the device, wherein:
program instructions to cause the OS of the device to locally generate: (i) the default virtual keyboard integrated within the OS of the device and (ii) the CAPTCHA comprise:
program instructions to receive, from the device, a public key of a key pair and request for the ordered string of characters, wherein a private key of the key pair is possessed by the device;
program instructions to encrypt, using the public key, the ordered string of characters; and
program instructions to send the ordered string of characters to the device; and
the CAPTCHA comprises:
the default virtual keyboard integrated within the OS of the device; and
a dynamic presentation of a series of highlighted keys of the default virtual keyboard integrated within the OS of the device, wherein:
each highlighted key is a particular key that is visually distinct from other keys of the default virtual keyboard integrated within the OS of the device;
each highlighted key corresponds to a character of an ordered string of characters required to be input; and
responsive to user selection of a first key that is highlighted, highlighting of the first key is removed and a second key is highlighted;
program instructions to receive a result of the CAPTCHA from the device; and
program instructions to perform an action based on the result.

13. The computer system of claim 12, wherein the first key is highlighted via modifying a size of the first key to be larger than all other keys on the virtual keyboard.

14. The computer system of claim 12, wherein:
the result is that the CAPTCHA was completed successfully; and
the action comprises granting access to the electronic resource.

15. The computer system of claim 12, wherein:
the result is that the CAPTCHA was not completed successfully; and
the action comprises denying access to the electronic resource.

* * * * *